United States Patent
Heinlen et al.

(10) Patent No.: US 8,342,750 B2
(45) Date of Patent: Jan. 1, 2013

(54) REUSABLE REFOLDABLE BAG

(76) Inventors: Christina Frances Heinlen, Lake Oswego, OR (US); Patricia Lettich Heinlen, Lake Oswego, OR (US); Katherine Victoria Heinlen, Lake Oswego, OR (US)

( * ) Notice: Subject to any disclaimer, the term of this patent is extended or adjusted under 35 U.S.C. 154(b) by 344 days.

(21) Appl. No.: 12/817,039

(22) Filed: Jun. 16, 2010

(65) Prior Publication Data

US 2010/0316308 A1    Dec. 16, 2010

Related U.S. Application Data

(60) Provisional application No. 61/268,861, filed on Jun. 16, 2009.

(51) Int. Cl.
| | |
|---|---|
| *B65D 30/00* | (2006.01) |
| *B65D 33/14* | (2006.01) |
| *B65D 33/16* | (2006.01) |
| *B65D 33/28* | (2006.01) |
| *B65D 33/24* | (2006.01) |
| *B65D 33/30* | (2006.01) |

(52) U.S. Cl. .................. 383/2; 383/24; 383/71; 383/72; 383/85; 383/91

(58) Field of Classification Search .................. 383/2, 4, 383/24, 71, 72, 85, 88, 89, 91; 190/103; 150/132, 142–144

See application file for complete search history.

(56) References Cited

U.S. PATENT DOCUMENTS

| 1,553,697 | A | * | 9/1925 | Lederer | 383/2 |
| 2,038,952 | A | * | 4/1936 | Niedorff et al. | 224/218 |
| 4,180,111 | A | * | 12/1979 | Davis | 383/2 |
| 4,332,338 | A | * | 6/1982 | Christiansen | 224/222 |
| 5,131,513 | A | * | 7/1992 | Gossage | 190/107 |
| 6,039,175 | A | * | 3/2000 | Wright | 206/37 |
| 6,640,856 | B1 | * | 11/2003 | Tucker | 150/130 |
| 2007/0138222 | A1 | * | 6/2007 | Goldman | 224/401 |
| 2008/0149235 | A1 | * | 6/2008 | Jay | 150/143 |
| 2012/0057809 | A1 | * | 3/2012 | Buller et al. | 383/2 |

* cited by examiner

*Primary Examiner* — Jes F Pascua
(74) *Attorney, Agent, or Firm* — Peter A Haas Esquire LLC

(57) ABSTRACT

A reusable and refoldable bag includes an integral locking mechanism that enables the bag to stay closed in a compact folded position (the folded position is about one-sixth to one-ninth of the original bag size compared to the bag when it is open and laid flat) when not in use and is easily opened when needed to carry contents. The integral locking mechanism includes a covering feature with a protected adhesive element and a flap with a mating adhesive element. In the folded position, the flap's adhesive element is placed under the covering feature and securely interlocks with the protected adhesive element. The locking mechanism can be disengaged and re-engaged for multiple reuses. The flap couples to a first side of the bag and extends outward from the bag. The covering feature couples to the first face adjacent to a top portion of the bag.

12 Claims, 6 Drawing Sheets

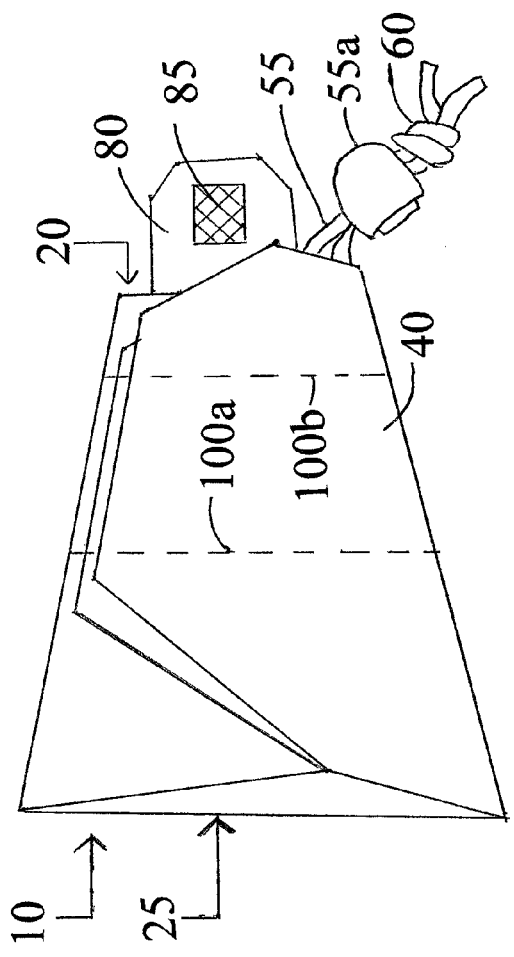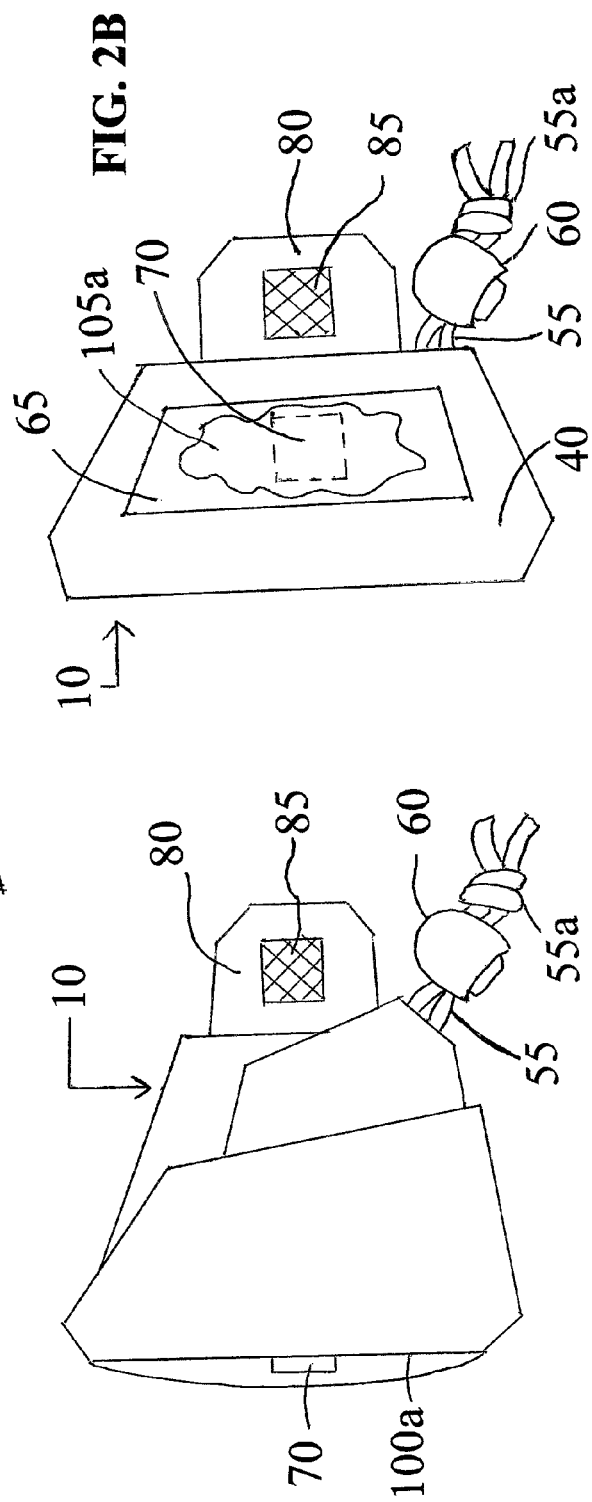

REUSABLE REFOLDABLE BAG

PRIORITY CLAIM

The present application claims benefit under 35 USC Section 119(e) of U.S. Provisional Patent Application Ser. No. 61/268,861 filed on 16 Jun. 2009. The present application is based on and claims priority from this application, the disclosure of which is hereby expressly incorporated herein by reference.

BACKGROUND

1. Technical Field

The present invention relates to bags, which can be refolded and reused.

Specifically, the present invention relates to a novel configuration for a reusable bag, with an integral locking (and unlocking) mechanism and a novel method of folding, securing, transporting, attaching, and releasing the bag.

2. Background

Reusable bags are generally desirable because they cut down on both environmental impact as well as cost for a savvy user. However, current bags present several problems during the process of attempted reuse. The most prevalent difficulties people have with reusable bags are encountered before or after use because current bags lack an integral closing mechanism that keeps a bag securely intact during the time they are attached to, and removed from, items while they are stored and transported for use. The lack of an appropriate closing mechanism impacts a bag's ease of storage, transport, access, identification, condition, visibility and the ability to stay securely intact. Inconvenience with all, or each, of these factors may cause a person to make a choice to use a single or limited use bag instead of a reusable bag. Using an appropriate closing mechanism is important because the goal of using reusable bags is to have people reuse each bag in their possession as many times as possible so fewer single or limited use bags may enter the waste stream.

The storage of an existing reusable bag may include, among other methods, leaving it loosely about, rolling and closing it in some fashion, and crunching, squishing, or stuffing it into a storage or transport vessel. Loosely left bags, which are unsecured, may be dirtied, damaged, may splay-out, or not be located at the time of next use. Bags that have been crunched, squished, and stuffed into a storage or transport vessel may be wrinkled, unsightly, and with an unkempt appearance when removed, and further storage in such a condition may reduce the useful life of the bag and age it prematurely. A rolled bag may be unwieldy to roll, unroll, and re-roll, and difficult to keep intact in the rolled position making it impractical for storage or transport in the collapsed or rolled position. Additionally, a rolled bag may be difficult to store because of its cylindrical shape, density, bulk, and size which may not allow it to be easily compressed so as to fit in a pocket, purse, backpack, or some form of carrying satchel, and, if it does fit, it may take up more space than desirable.

Many known reusable bags do not have an integral locking and unlocking mechanism for preventing the bag from splaying out, opening unintentionally, and snagging on other items, for example. The lack of an integral locking and unlocking mechanism creates inconvenience to the bag user, who must attempt to re-close it and hope it stays in the desired (closed) position. Thus, it would be beneficial to have a reusable bag that included a locking and unlocking mechanism to prevent this occurrence. Further, it is desirable to have the locking and unlocking mechanism as an integrated piece of the bag rather than as a separate securing mechanism (such as a rubber band, strap, belt, and the like), which is prone to loss and inadequately maintains the bag in the folded or stored position.

A separate transport or storage vessel may hamper reuse of a bag. A bag's owner may not want to hand carry a separate and bulky storage or transport vessel along with a purse or other items while shopping. If a storage and transport system is inconvenient and undesirable it may not be utilized, making accessibility a potential problem at the point of next use.

A shopper may carry many reusable bags of various sizes for different needs, so quick and easy access to the right bag is desirable. Locating a rolled or stuffed bag contained within a larger vessel, which carries multiple items, may be frustrating. Accessing a desired bag may be difficult when it is one of many bags stuffed into a confined storage or transport vessel as the compression of multiple bags may not allow for expeditious viewing, comparison, selection, or retrieval. In addition, multiple different bags may have to be withdrawn from a larger vessel and displayed so the bag's owner may choose the appropriate size, shape, and function needed. Repacking the unselected bags into the larger vessel's cavity may be another inconvenience for a bag owner. If access to a desired reusable bag is limited and inconvenient, a frustrated bag owner may choose not to reuse it.

A rolled up or stuffed bag may cause difficulty in identifying the bag as belonging to a certain individual or group with personal or general information, or as an advertisement for a team or business with logos or other identifying marks. Many reusable bags look similar and in a setting where many people are using reusable bags, it may be difficult to identify whose bag is whose. One or more excess pieces, tags, or an additional container, which may be lost or damaged during normal use, may be required for identification.

A bag's condition, and whether it looks appealing, may in large part effect whether it is reused again. A bag which has been crunched or left loosely around is likely not to be valued as highly as one that has been well taken care of and, the bag may end up underfoot and dirty, spilled upon, damaged, thrown away, or lost which makes it less likely to be reused. This is because a bag's owner, and others, will see the carried bag's poor condition as looking "tacky" or so unattractive as to make the bag's carrier the owner of something unkempt, dirty, or otherwise undesirable. Because our physical appearance and what we wear and carry with us largely defines us as individuals to society and the public at large, and most people would find it undesirable to be seen as unkempt, then a bag whose condition is such is unlikely to be reused.

Many bags, when not in use, are stuffed into another container to be stored or transported. When removed they may end up in a crunched and wrinkled condition with limited options for rectifying this problem. Many reusable bags are manufactured using fabrics and printing methods, which may not tolerate high heat; and as such, may not be ironed. As a result, many reusable bags may not look fresh after being crunched, stuffed, twisted, dirtied, or damaged prior to the next reuse opportunity. The poor appearance of a bag may limit the number of times an owner may want to reuse it, in opposition to the goal for a reusable bag.

Another shortcoming of known reusable bags includes the lack of a personal identification label. Thus, it would be desirable for an improved reusable bag to include personal identification means that can enable to user to readily and quickly identify his or her own bag in both the stored or folded position, and in the open position.

Thus, there remains a need for a bag that can be reused and that overcomes the limitations and problems of the prior-art and, further, that solves problems not contemplated in the art.

SUMMARY OF THE INVENTION

The present invention contemplates a reusable refoldable bag having an integral locking and unlocking mechanism and further comprising a top portion, a bottom portion, a first side, a second side, a first face, and a second face. A flap is attached to the first side of the bag and extends outward from the bag with a flap adhesive element affixed to the flap and co-facing with the second face of the bag. A covering feature is generally centrally located on the first face of the bag, and the covering feature is affixed to the first face at a part of the covering feature closest to the top portion of the bag, a part of the first face closest to the bottom portion of the bag, and a part of the first face closest to the first side of the bag. A protected adhesive element is affixed to the first face of the bag directly under the covering feature such that the protected adhesive element is located between the first face of the bag and the covering feature.

Another embodiment of the present invention is a method of folding a bag. The method comprises the step of identifying a top portion of the bag, a bottom portion of the bag, a first side of the bag, a second side of the bag, a front face of the bag, and a rear face of the bag. The method further comprises the step of positioning a flap which is affixed to the first side of the bag, and which has a flap adhesive element affixed thereto, such that the flap protrudes away from the bag. The method further comprises the step of folding the bag along a first horizontal crease, wherein the bag is folded along the first horizontal crease such that the top portion of the bag is folded towards the rear face of the bag. The method includes the step of folding the bag along a second horizontal crease, wherein the bag is folded along the second horizontal crease such that the bottom portion of the bag is folded towards the rear face of the bag. The method includes folding the bag along a first vertical crease, wherein the bag is folded along the first vertical crease such that the second side of the bag is folded towards the rear face of the bag; and folding the bag along a second vertical crease, wherein the bag is folded along the second vertical crease such that the first side of the bag is folded towards the rear face of the bag.

Another embodiment of the present invention is a method of closing the bag in its completely folded and secured position, known as its final state or, preferably, its folded state. This method comprises the step of identifying a covering feature of the bag, a protected adhesive element, a flap, and a flap adhesive element. The method further comprises the step of inserting the flap between the covering feature and at least one other portion of the bag. The method further comprises the step of attaching the flap adhesive to the protected adhesive element between the covering feature and at least one other portion of the bag. When the bag is folded smoothly in this manner, wrinkling is minimized. To undo the bag the reverse procedure is followed.

Another embodiment of the present invention is a method of attaching the bag in its folded state, to an item on or about the body, such as an article of personal clothing or accessory, lanyard or jewelry, or to a carried item such as a purse, briefcase, backpack, tote bag, a carabiner or another connector, or other item on or about the body. This method comprises the step of tying a knot with the protruding drawstring and utilizing the locking mechanism and stopper to prevent a knot from becoming unintentionally untied because the girth of the locking mechanism or stopper may be larger than a space within the tied drawstring. Additionally, this method allows the bag to be intentionally untied by relaxing the protruding drawstring and knot and slipping the locking mechanism and stopper back through the loosened opening from whence it came to be tied, thereby untying the drawstring so it may be removed from the item to which it was tied. Alternatively, this method comprises the step of placing a space between the double drawstring, locking mechanism or stopper to form a loop through which a carabiner or other connector can be threaded such that a bag in its folded state can be hung.

Another embodiment of the present invention is a method of attaching one of a loop of cord and a cord loop with a stopper to a side seam of the bag located in the flap seam near where the flap is inserted and sewn. This cord and stopper will protrude from the side seam to serve as a tying mechanism or a loop in which a carabiner or connector can be threaded, such that a bag in its folded state can be hung.

Another embodiment of the present invention includes providing a bag as just described and modifying the bag to include an overlying or covering feature jutting from a seam on the side of the bag, thus sharing a common stitch for ease of manufacture. Further, the bag is modified to include vertically arranged carrying straps. Such straps are stitched to both the front and back face of the bag. A portion of this stitching can be gapped to enable the jutting covering feature to tuck under the strap at the gap in stitching when the bag is in the folded or stored state. An integral locking and unlocking mechanism (such as a hook and loop fastener system) is included to selectively secure the jutting covering feature under the strap with the companion hook-and-loop type fastener residing under the strap.

This invention contemplates other folding methods including folding the bag in half, thirds, and quarters, for example.

BRIEF DESCRIPTION OF THE DRAWINGS

FIG. 2 is a rear right side view of a partially folded bag according to a first preferred embodiment of the present invention.

FIG. 2A is a rear right side view of a partially folded bag according to a first preferred embodiment of the present invention.

FIG. 2B is a rear right side view of a partially folded bag according to a first preferred embodiment of the present invention.

FIG. 6 1 is a front view of an unfolded bag according to a second preferred embodiment of the present invention.

DETAILED DESCRIPTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

Disclosed herein is a reusable, refoldable bag. Terms used to describe the bag include "front face," "rear face," "left side," "right side," "top," and "bottom." In one embodiment, elements are described as attached to the left side, though other embodiments may be a mirror image of the first embodiment such that one or more of the same elements are attached to the right side. The terms "front," "rear," "left," "right," "top," and "bottom" are merely used to aid in understanding the structure and layout of the bag and are not meant to be limiting in any way.

Bag Structure

Figure 1:
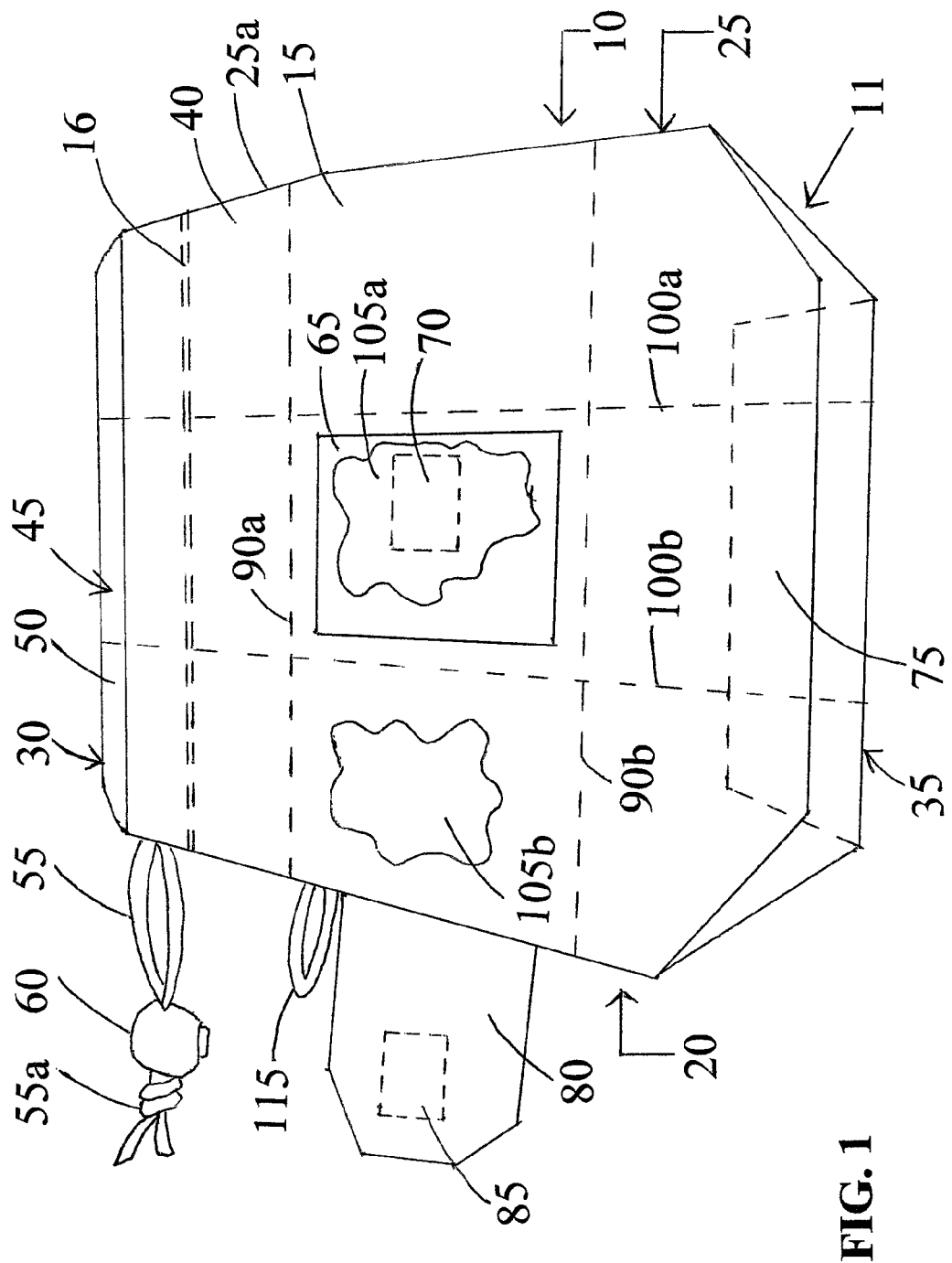
FIG. 1 is a front view of an unfolded bag according to a first preferred embodiment of the present invention.
Figure 1A:
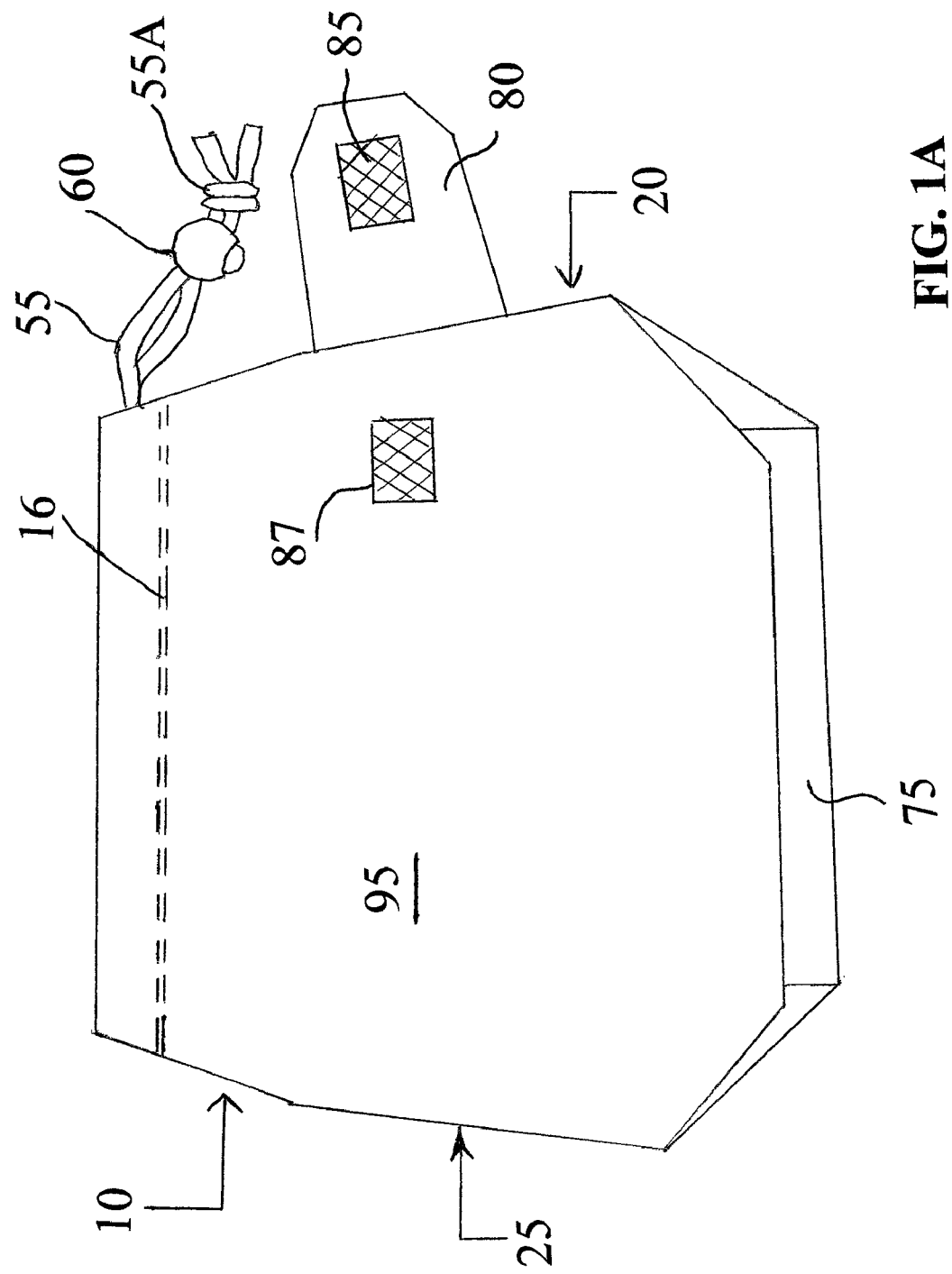
FIG. 1A is a rear view of an unfolded bag according to a first preferred embodiment of the present invention.

FIG. 1 shows the bag 10 with an outer facing portion 15. The bag 10 includes a left side 20 and a right side 25, as well as a top portion 30 and a bottom portion 35. The bag 10 further includes a front face 40, and a rear face 95 as shown in FIG. 1A. Returning to FIG. 1, the rear face 95 is generally on an opposite side of the bag from the front face 40. The front face 40 is attached to the rear face 95 by stitching gluing or some other comparable method of adhering the two faces together along a left seam 20a, and a right seam 25a, positioned generally at the left side 20 and the right side 25, respectively. In certain embodiments the bag 10 is constructed of polypropylene, although in other embodiments the bag may be constructed of one or more of polypropylene, canvas, cotton, silk, polyethylene, hemp, polyesters, nylons, rayons, or any other synthetic, natural, blended, or recyclable material which would be recognized as appropriate by one skilled in the art.

The top portion 30 of the bag 10 includes an opening 45 such that the bag interior 50 is accessible. A drawstring 55 is threaded throughout the circumference of the bag 10 and positioned generally between the outer facing portion 15 and the bag interior 50 and just under the opening 45. For example, the drawstring 55 may be a continuous loop of cord, which is threaded throughout the circumference of the bag 10.

In certain embodiments the drawstring 55 may be threaded through a casing inserted between the outer facing portion 15 and the bag interior 50, or a portion of the bag 10 may be folded over and sealed or stitched in some manner to form the casing. Alternatively, the drawstring 55 may be threaded through one or more holes or grommets in the outer facing portion 15 of the bag 10 such that at least one or more portions of the drawstring are exposed.

When the drawstring 55 is pulled, the circumference of the drawstring is reduced which, in turn, reduces the circumference of the opening 45 and thereby cinches the top portion 30 of the bag 10 shut. Alternatively, pressure applied to the inside of the opening 45, directed outward, increases the circumference of the opening which in turns reduces the length of the drawstring protruding from the bag 10. It will be recognized that another method of increasing the circumference of the opening 45 may include applying pressure to the drawstring 55 itself, the locking mechanism 60, or the stopper 55a in the direction of the bag.

In the present embodiment, the locking mechanism 60 is attached to the drawstring 55. The locking mechanism 60 can be used to secure the drawstring 55 and secure the opening 45 in the closed position, though in other embodiments the locking mechanism may not be included and the drawstring may be secured in another manner. The locking mechanism 60 may be a cord lock or some other locking mechanism. The drawstring 55 includes a stopper 55a at the end of the drawstring furthest from the bag, which prevents the locking mechanism 60 from sliding off the end of the drawstring. The stopper 55a may be a knot tied in the drawstring 55 with two protruding drawstring tails or a loop end, a metal or plastic stopper secured in or around the drawstring, a continuous cord loop, or some other appropriate stopper.

The bag 10 further includes a covering feature 65 which is attached to the front face 40 of the bag at least on two sides of the covering feature such as one or more of the side of the covering feature closest to the top portion 30, the bottom portion 35, or the left side 20 of the bag such that the covering feature forms a strip, cover or pocket which will herein generally be referred to as a "space." The covering feature 65 is generally centrally located between the right side 25 and the left side 20 of the bag 10, as well as generally centrally located between the top portion 30 and the bottom portion 35 of the bag. The covering feature 65 is not attached to the bag 10 at the side of the covering feature closest to the right side 25 of the bag. In an alternative embodiment, the covering feature 65 may be located at any point on the outer facing portion 15 of the bag such as on the rear face 95, or at some other point on the front face 40.

In the illustrated embodiment, the covering feature 65 is a square, though in other embodiments other shapes such as a triangle, an oval, a circle, a rectangle, a parallelogram, or any other suitable shape may be used instead. In these embodiments, the covering feature may be attached to the bag on at least two sides. In the current embodiment, the covering feature 65 is polypropylene, although in other embodiments the covering feature may be constructed of one or more of polypropylene, canvas, cotton, silk, polyethylene, hemp, polyesters, nylons, rayons, or any other synthetic, natural, blended, or recyclable material which would be recognized as appropriate by one skilled in the art. Generally, the covering feature 65 is constructed of the same material as the bag 10, though in other embodiments the covering feature and the bag may be constructed of different materials.

A protected adhesive element 70 is attached to the front face 40 such that it is covered by the covering feature 65 and lies between the front face and the covering feature. In the current embodiment, the protected adhesive element 70 is either the male or the female form of a hook and loop type fastener such as a fastener commonly sold under the trademark VELCRO®. In other embodiments the protected adhesive element may be a snap, hook or some other sort of clasp element, a sticky or magnetic substance, or some other form of adhesive or fastening substance. If a secondary adhesive element is affixed to the protected adhesive element 70, the covering feature 65 covers the protected adhesive element and thereby protects the protected adhesive element from incidental or un-intentioned contact, which could separate the secondary adhesive element from the protected adhesive element, as described below.

The bottom portion 35 of the bag 10 includes a gusset element 75 which projects into the bag interior 50 when the bag is in its unfolded state, lying flat, such as in FIG. 1, however it will be recognized that the base of the bag can be expanded such that the gusset forms a right angle with at least one of the front face 40 and the rear face 95. The gusset element 75 helps guide the seams and fabric of the bag 10 when the bag is folded, so that when the bag is folded as will be described below, there are no extra creases or bunches in the fabric, and when the bag is unfolded the gusset expands such that when the bag is opened, the bag's base can more easily display multiple items contained within the bag interior 50. This allows a user to more easily see and access the contents within the bag interior 50.

Attached to the same side of the bag as the drawstring 55 is a flap 80, which extends outwardly from the bag. In the present embodiment, both the flap 80 and the drawstring 55 are on the left side 20 of the bag 10 and the flap is generally centrally located vertically between the top portion 30 and the bottom portion 35 of the bag. In one embodiment the flap 80 is stitched directly into the left seam 20a. In other embodiments, the flap 80 may be attached to the left side 20 of the bag in a variety of different ways. In the current embodiment, the flap 80 is polypropylene, although in other embodiments the covering feature may be constructed of one or more of polypropylene, canvas, cotton, silk, polyethylene, hemp, polyesters, nylons, rayons, or any other synthetic, natural, blended, or recyclable material which would be recognized as appropriate by one skilled in the art. Generally, the flap 80 is constructed of the same material as the bag 10, though in other embodiments the covering feature and the bag may be constructed of different materials.

In FIG. 1, the flap 80 is depicted as generally rectangular though in other embodiments the flap may be a square, triangular, circular, elliptical, or some other suitable shape, and the flap may be rounded at the edge furthest from the bag, squared at the edge furthest from the bag, pointed at the edge furthest from the bag, or be in some other shape. A flap adhesive element 85 is attached to the flap 80 on the rear side of the flap such that the flap adhesive element is on the same side of the bag as the rear face 95 of the bag when the bag is lying unfolded as shown in FIG. 1.

The flap adhesive element 85 is operable to mate with the protected adhesive element 70 if they come into contact with one another. For example, if the protected adhesive element 70 is the male part of a common hook and loop type fastener, then the flap adhesive element 85 is the female part of the common hook and loop type fastener. Alternatively, the protected adhesive element 70 may be the female part of a hook and loop type fastener, and the flap adhesive element 85 would then be the male part of the hook and loop type fastener. The flap adhesive element 85 and the protected adhesive element 70 may alternatively be of a different type of fastener such as a snap fastener, a sticky or magnetic substance type fastener, or some other type of fastener. All such variations and equivalents are herein envisioned within the scope and spirit of the present invention.

The bag may further include an anchor adhesive element 87 as shown in FIG. 1. The anchor adhesive element 87 is attached to the rear face 95 and generally centrally located between the top portion 30 and the bottom portion 35 of the bag. The anchor adhesive element 87 is situated a distance away from the left side 20 of the bag 10 roughly equivalent to the distance between the left side of the bag and the flap adhesive element 85. If the flap adhesive element 85 is folded at the point where it is affixed to the bag, then the flap adhesive element comes into direct contact with the anchor adhesive element 87 while the flap 80 lies generally flat against the rear face 95 of the bag. The anchor adhesive element 87 is able to mate with the flap adhesive element 85 and is generally the same type of connector as the protected adhesive element 70. For example, if the protected adhesive element 70 is a male hook and loop type fastener, then the anchor adhesive element 87 is also a male hook and loop type fastener. Similarly, if the protected adhesive element 70 is a female hook and loop type fastener, then the anchor adhesive element 87 is also a female hook and loop type fastener. As described above, the anchor adhesive element 87 may also be a snap type fastener, a sticky or magnetic adhesive type of fastener, or some other type of fastener, which would be recognized as appropriate by one skilled in the art.

When the flap adhesive element 85 adheres to the anchor adhesive element 87, then a closed loop is formed between the outer facing portion 15 of the bag 10 and the flap 80. This closed loop may be used to secure the bag to an item such as a strap, a carabiner, a belt, a backpack, or some other item, which may be worn on or about the body.

In an alternative embodiment, the protected adhesive element 70 is attached to the inside of the covering feature 65 such that the protected adhesive element is situated between the front face 40 and the covering feature. In this embodiment the flap adhesive element 85 is on the same side of the flap 80 as the front face 40 when the bag is lying unfolded as shown in FIG. 1 such that when the flap is inserted into the space formed by the covering feature 65 and the front face of the bag 10, the flap adhesive element comes into contact with, and adheres to, the protected adhesive element 70.

In this alternative embodiment, the anchor adhesive element 87 is situated on the front face 40 of the bag 10 rather than the rear face 95 so that the flap 80 may be folded across the front face of the bag such that the flap adhesive element 85 comes into contact with, and adheres to, the anchor adhesive element 87 and the flap lies generally flat against the front face of the bag. In this embodiment, the covering feature 65 is not attached to the front face 40 on the side of the covering feature, which is meant to receive the flap, so as to allow the flap adhesive element 85 to adhere to the protected adhesive element 70.

The bag 10 shown in FIG. 1 has generally linear sides, however in an alternative embodiment (not shown) the right side 25 and the left side 20 may taper towards the top portion 30 such that the top portion has a smaller circumference than the bottom portion 35. In one embodiment the tapering begins at a vertical point on the bag about one third of the way from the top portion 30 to the bottom portion 35 and occurs generally throughout the top third of the bag 10, though in other embodiments the tapering may occur higher or lower on the front face 40.

The bag 10 includes a gusset element 75 adjacent to both the front and back panels on the bottom portion of the bag. The gusset element is creased inward to enable the bag to fold flat, yet also enable the bag to expand to hold contents.

The bag 10 as described above offers several benefits over existing bags. When the bag 10 is being used, an individual may be able to transport an individual's items or lunch in the bag or, alternatively, the bag could be used by the individual to transport groceries, sundries, or other goods.

In one embodiment the bag 10 is about the size of a common, oversized, paper lunch sack and is able to hold items including a banana, a sandwich, a bag of chips, a juice box, a beverage bottle, snacks, boxed salads or other containerized items, or other types of items of similar size. In another embodiment the bag 10 is about the size of a common grocery and shopping tote bag and is able to transport groceries such as a bunch of bananas, a loaf of bread, sundries, two gallons of milk, or other materials or items. In other embodiments the bag 10 may be larger or smaller than the above examples, and such embodiments fall within the spirit and scope of the present invention.

In another embodiment (not shown in the figures) the bag 10 includes straps or handles to ease carrying (for example as used on a grocery tote). Accordingly, such a modified bag would include an overlying or covering features jutting from a seam on the side of the bag, thus sharing a common stitch for ease of manufacture. Further, the bag is modified to include vertically arranged carrying straps. Such straps are stitched to both the front and back face of the bag. A portion of this stitching can be gapped to enable the jutting covering feature to tuck under the strap at the gap in stitching when the bag is in the folded or stored state. An integral locking and unlocking mechanism (such as a hook and loop fastener system) is included to selectively secure the jutting covering feature under the strap.

After the bag 10 is used to transport items within its confines and when the user finds that it is soiled, it then can be washed by hand and air dried, or simply emptied out and reused.

Additionally, the drawstring 55 may be used to secure other items to the bag 10 such as a foldable placemat, a napkin, food-storage bags, or utensils for ease of eating the contents stored within the bag. The drawstring 55 may also be used to attach one or more other non-food related items to the bag 10 such as pen, a note, envelope, keys, a badge, nametag, and some similar object. In addition, when the bag 10 is in its folded state, one or more of the drawstring 55, the stopper 55a, and the locking mechanism 60 may be used to secure bag 10 to, and remove bag 10 from, an item on or about the body such as an article of personal clothing, an accessory, a lanyard, jewelry, or a carried item such as a purse, briefcase, backpack, tote bag, carabiner, other connector, or another item on or about the body by means of tying, another connector, or some other form of fastening. By attaching the bag 10 to another item, the user can greatly increase the visibility of the bag, thereby displaying identification or advertising information to third parties. Alternatively, multiple bags may be affixed to a carabiner, an "O" ring, a "D" ring or some similar item for easily storing multiple bags. Thus, for example, a user could carry multiple bags attached to a carabiner or some other item to carry the bags while leaving the user's hands free, and then, when the bags were necessary, the user could quickly and easily compare the different bags to choose a bag of a desirable size and shape.

The drawstring 55 may be attached to an item by tying the drawstring to the object. For example, a knot may be tied in the drawstring 55, around the object, and the locking mechanism 60 or the stopper 55a may be used to prevent the knot from becoming unintentionally untied because the girth of the locking mechanism or stopper may be large enough that the stopper or locking mechanism cannot pass through the knot. The knot can then be intentionally untied by relaxing the knot and slipping the locking mechanism 60 or the stopper 55a back through the loosened opening. In this manner, the bag 10 may be attached to, or removed from, some other item as described above.

In an alternative embodiment, one or more additional pocket elements (not shown) may be included in at least one of the outer facing portion 15 or the covering feature 65. For example, the additional pocket(s) or the covering features may be sewn into the space between the outer facing portion 15 and the bag interior 50, or the covering feature (65) may include two or more pieces of material folded or affixed to one another such that a hollow space is presented and accessible between the two pieces of material making up the covering feature. Alternatively, the additional pocket(s) may simply be one or more additional pieces of folded material, such as, but not limited to, strapping material or self-fabric, attached to the outer facing portion 15 or the covering feature 65 such that a hollow space is presented between the additional pieces of material and the outer facing portion or the covering feature.

The hollow space created between the two or more pieces of material may be accessible by approach from outside of the bag, i.e. with an opening in the outer facing portion 15, or near side seams 25a or 20a, or the hollow space may be accessible by approach from inside of the bag, i.e. with an opening in the bag interior 50, or both. The hollow spaces may be secured by a fastener, such as a hook and loop type fastener, a snap, a latch, a buckle, a zipper, stitching, or other similar fastener. The hollow spaces would be accessible by operating the fastener, and securable through operation of the same fastener. It is envisioned that these hollow spaces, also termed additional pocket elements, could be used to assist with the use of the integral locking and unlocking mechanism to hold items such as money, keys, coins, identification, medicine, or some other similar item. Ideally, the additional pocket elements could serve to keep these items separate from the other contents of the bag so that they could be accessed quickly, easily, and efficiently.

In an alternative embodiment, a string, cord, or similar object is affixed to the bag 10 which is used to tie, wrap around, or otherwise attach items such as keys, a badge, a name tag, or some similar portable object.

Folding the Bag.

When the bag 10 is not being used to transport items, the bag is folded in such a way that it is very compact and easy to store and transport in its final, folded, or stored state. The bag 10 is first folded along a first horizontal crease 90a running generally from the left side 20 of the bag to the right side 25 of the bag, and vertically situated at a point about one third of the distance from the top portion 30 of the bag towards the bottom portion 35. The top portion 30 of the bag 10 is folded along the first horizontal crease 90a towards the rear face 95 of the bag so that the rear face of the bag between the top portion of the bag and the first horizontal crease is in contact with, and facing, the rear face of the bag generally located directly below the first horizontal crease and generally posterior to the portion of the front face 40 to which the covering feature 65 is attached.

Preferably, folding the bag is performed in the following sequence, although other sequences may be used without detracting from the scope and spirit of the invention: 1) lay the bag flat with the pocket face down; 2) fold the top down along its first horizontal crease 90a; 3) fold the bottom up along its second horizontal crease 90b; 4) fold the bag to right in this order a) vertical crease 100a, b) followed by vertical crease 100b, then c) insert flap.

The bag 10 is then folded along a second horizontal crease 90b running generally from the left side 20 of the bag to the right side 25 of the bag, and vertically situated at a point about two thirds of the distance from the top portion 30 of the bag towards the bottom portion 35 of the bag when the bag is unfolded and laid flat. The bag 10 is folded such that the bottom portion 35 of the bag is folded towards the rear face 95 of the bag along the second horizontal crease 90b so that the bottom portion of the bag overlaps with the already folded top portion 30 of the bag, and the rear face of the bag between the second horizontal crease and the bottom portion 30 of the bag faces, and is in contact with, the front face 40 of the bag between the top portion 30 and the first horizontal crease 90a. FIG. 2 illustrates the bag 10 when folded as described above.

After the bag 10 has been folded as described above, the right side 25 of the bag is folded along a first vertical crease 100a which extends generally vertically from the top portion 30 of the bag towards the bottom portion 35, and which is horizontally located at a point about one third of the distance from the right side 25 of the bag towards the left side 20, as shown in FIG. 2A. The bag 10 is folded such that the right side 25 of the bag is folded towards the rear face 95 of the bag along the first vertical crease 100a so that the rear face of the bag located between the first vertical crease 100a and the right side 25 of the bag is folded towards the portion of the rear face generally centrally located posterior to the covering feature 65. At this point the portion of the front face 40 of the bag located generally between the first vertical crease 100a and the right side of the bag 25, and between the second horizontal crease 90b and the bottom portion 35 of the bag will lie facing, and in contact with, the portion of the front face located generally between the second horizontal crease and the bottom portion, and the portion of the front face located adjacent to, and to the left of, the first vertical crease.

Next, the bag 10 is folded along a second vertical crease 100b which extends generally vertically from the top portion 30 of the bag to the bottom portion 35 of the bag, and which is horizontally located at a point about two thirds of the distance from the right side 25 of the bag to the left side 20 of the bag when the bag is unfolded and laid flat, as shown in FIG. 2B. The bag 10 is folded such that the left side 20 of the bag, as well as the flap 80, is folded along the second vertical crease 100b so that the rear face 95 of the bag located between the second vertical crease 100b and the left side 20 of the bag is folded towards the portion of the rear face generally located posterior to the covering feature 65. At this point, the portion of the front face 40 generally located between the second horizontal crease 90b and the bottom portion 35, and between the second vertical crease 100b and the left side 20, is facing, and in contact with, the portion of the front face located generally between the first horizontal crease 90a and the second horizontal crease, and between the first vertical crease and the right side 25 of the bag.

The method of folding the bag also includes positioning the first horizontal crease between the first side and the second side of the bag and is generally vertically located at a point about one third of the distance from the top portion to the bottom portion, and the second horizontal crease extends between the first side and the second side of the bag and is generally vertically located at a point about two thirds of the distance from the top portion to the bottom portion.

The method further comprises the steps of folding the bag 5 along a first vertical crease and folding the bag along a second vertical crease, so that the folded bag obtains a square-like shape when folded along the first horizontal crease, the second horizontal crease, the first vertical crease, and the second vertical crease.

The method further comprising providing the bag with a covering feature affixed to the bag at a portion of the covering feature located closest to the first side of the bag, and wherein the covering feature is affixed to the bag at a portion of the covering feature located closest to the second side of the bag.

Figure 3:
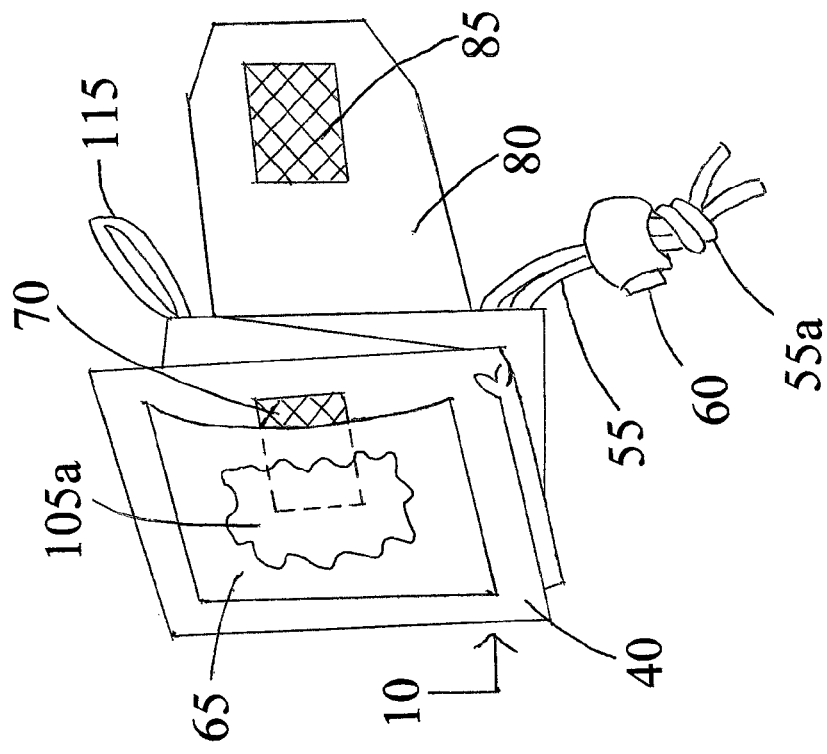
FIG. 3 is a front view of a partially folded bag according to a first preferred embodiment of the present invention.

FIG. 3 depicts the bag 10 folded as described above. The covering feature 65 and the protected adhesive element 70 contained therein are shown on the front face 40 of the bag 10. The drawstring 55, with the lock 60, projects from the lower right side of the bag 10 as oriented in FIG. 3, and similarly the flap 80 now projects from the right side of the bag as oriented in FIG. 3. The flap has essentially been flipped around so that the rear-facing portion of the flap, as seen in FIG. 1, is now facing in the same direction as the front face 40 portion of the bag containing the covering feature 65 in FIG. 3. It should be noted that although the flap 80, the flap adhesive element 85, and the protected adhesive element 70 are shown as squares, in other embodiments one or both of them may be rectangles, parallelograms, ovals, triangles, or some other shape, or folded pieces of fabric or strap-like materials.

Figure 4:
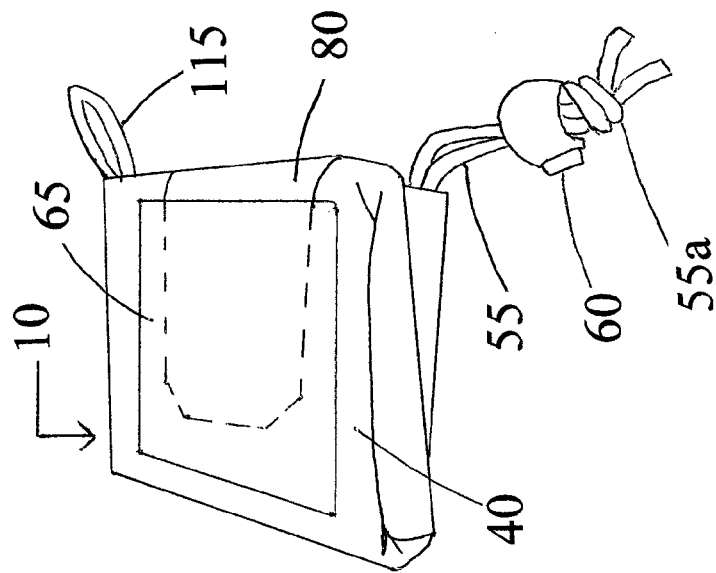
FIG. 4 is a front view of a completely folded bag according to a first preferred embodiment of the present invention.

To reach its folded state, the folded form of the bag 10 may be secured by inserting the flap 80 containing the flap adhesive element 85 into the space created between the covering feature 65 and the front face 40 of the bag such that the flap adhesive element comes into contact with, and adheres to, the protected adhesive element 70. FIG. 4 illustrates a bag 10 completely folded as described above with the flap 80 inserted between the front face 40 and the covering feature 65.

As can be seen in FIG. 3, by folding the bag 10 thus and securing the flap adhesive element 85 to the protected adhesive element 70, the bag forms a generally rectangular or square shaped packet, which exhibits several advantages. For example, the rectangular or square shaped packet form of the bag 10 is much more compact and lies flatter than rolled-up reusable bags. In certain embodiments the bag may be small enough to be pocketed in a shirt or jeans pocket, or easily sized to fit inside a purse, backpack, duffle, or other larger bag. In other embodiments the bag may be about the size of a woman's compact.

Additionally, when the bag 10 is secured in its folded state and carried by the protruding drawstring 55, locking mechanism 60, or stopper 55a, then the bag will remain securely intact even if swung or shaken vigorously. Because of this, the drawstring 55, locking mechanism 60, or stopper 55a may be affixed to a purse, a bag, a buckle, a strap, a handle, and some other object by means of itself, or a fastener such as a carabiner, clip, rubber band, snap, or some other fastener.

Also, the adhesive elements securing the bag are protected by the covering feature 65 so that it is unlikely that incidental contact such as brushing the bag against clothing or an external surface would pull the flap adhesive element 85 from the protected adhesive element 70 thereby causing the bag to become unsecured. The rectangular or square shaped packet can be stored on its own, outside or inside another vessel, and can be securely closed, easily transported, and quickly located and accessed.

An additional advantage of the described bag 10 is that a first visual element 105a may be placed on the covering feature 65 as shown in FIGS. 1 and 3. Thus, when the bag is either in its folded state or its unfolded state, the first visual element 105a will be immediately apparent and visible to an onlooker. The described embodiment is further unique in that the visual element 105a is on an integral component of the bag such as the covering feature 65, and therefore it is much more unlikely that the element of the bag on which the visual element is placed will be removed by force or by accident.

In the present embodiment, a second visual element 105b, such as that shown in FIG. 1 (an identifying label), is placed on the portion of the front face 40, located generally between the left side 20 and the second vertical crease 100b, and generally between the first horizontal crease 90a and the second horizontal crease 90b. When the bag 10 is folded as shown in FIG. 3, the described portion of the front face 40 will face outward from the folded bag and be visible on the side of the bag opposite the covering feature 65. It should be noted that the covering feature could be a covering piece, a flap, a pocket, a fold, a pleat, or other similar structure.

One or both of the first and second visual elements (105a or 105b) may be words, logos, advertising, trademarks, patterns, motifs, or any other visual decoration. Alternatively, one or both of the first and second visual elements may simply be a portion of the bag which allows the owner to write, draw, doodle, or otherwise alter the visual element. By way of example, the second visual element could already be printed with the phrase "This bag owned by" and allow the individual to write their name in a provided space allowing for easy visual personal identification by the owner or others.

Figure 6:
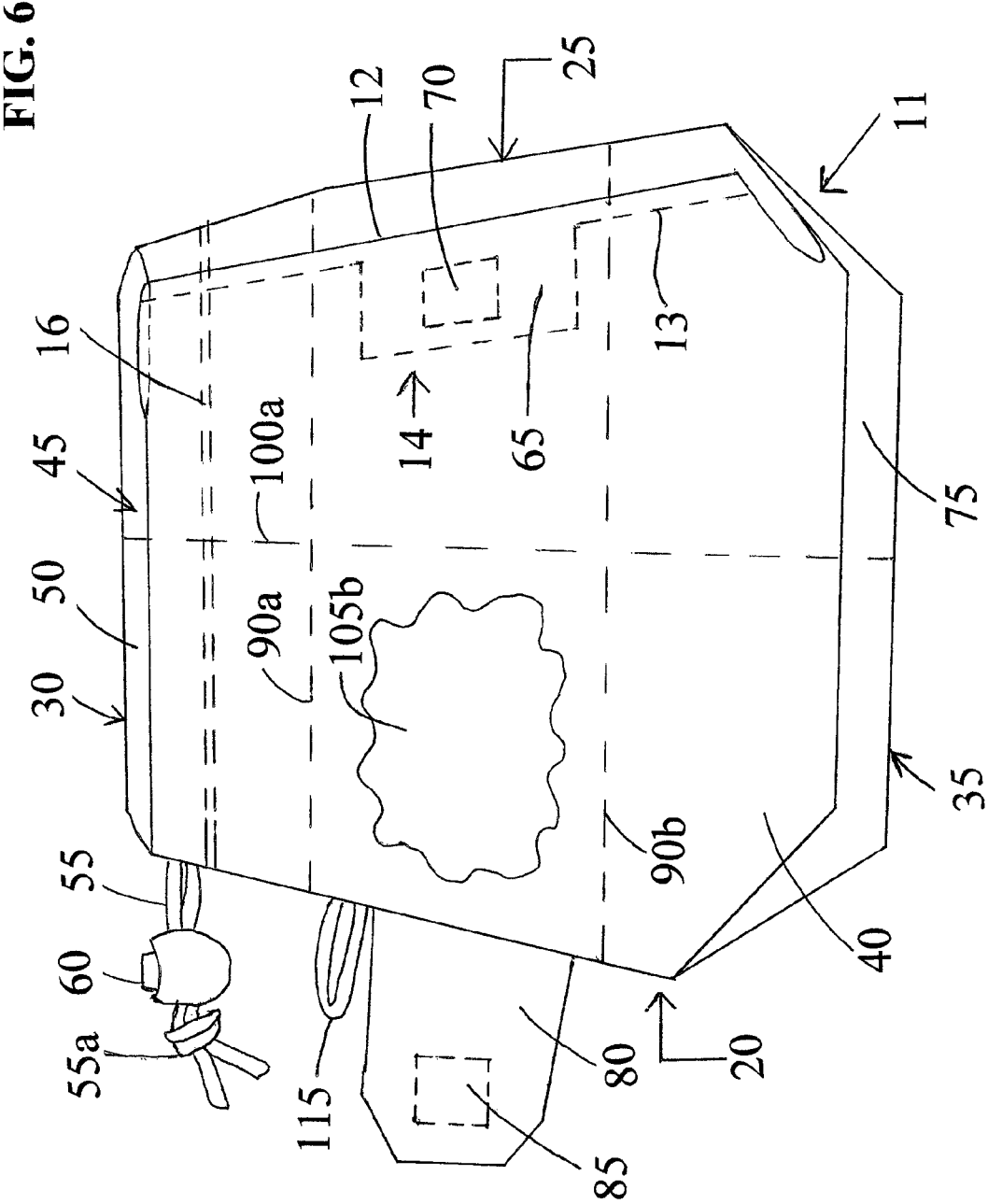

FIG. 6 illustrates a second preferred embodiment of the bag wherein the covering feature comprises a first visual element 105a positioned right or left of center so that the visual element is visible to an observer whether the bag is in a folded state or an unfolded state, when the bag is folded in half (instead of in thirds), for example.

An exhibited advantage of this method of folding is that when the bag 10 is closed, it is compact in nature with two sides showing as described above. Therefore, the bag 10 can more easily be kept in good condition because fewer of its sides or dimensions are exposed to other elements. Additionally, because the bag 10 is folded neatly and compactly, wrinkles, wear and tear are reduced. Thus, the bag 10 will remain in a desirable condition for a greater amount of time, thus encouraging reuse of a neat and compact product. When use of the bag 10 is desired, then the bag can be quickly accessed and utilized by separating the flap adhesive element 85 from the protected adhesive element 70, unfolding, and opening the bag.

It is envisioned that a bag 10, as described herein, could be used by as a reusable lunch bag and, alternatively, a slightly larger bag could be used by a shopper as a tote bag with handles or holes in the bag fabric (material) itself. The bag 10 described herein is a unitary piece, and so an additional container (for transporting the folded bag when empty of contents) is unnecessary and, in fact, is undesirable because more waste is created by the unnecessary storage bag. Because the bag 10 is a unitary piece, it is more convenient to use and reuse, and therefore increases the likelihood of such reuse.

As stated above, the bag 10 is merely one embodiment of the present invention. Additional embodiments are herein envisioned where the flap 80 and/or the drawstring 55 may be located on the right side 25 of the bag 10, for example the flap may be stitched directly into the right seam 25a, and then the portion of the covering feature 65 which is not attached to the front face 40 and the order of folding the bag 10 would be likewise reversed. Alternatively, the flap 80 could be located on the top portion 30 or the bottom portion 35 of the bag and the covering feature 65 could be unattached to the front face 40 at the portion of the covering feature closest to the bottom portion of the bag or the top portion of the bag, respectively.

In other alternative embodiments, the bag could be folded more or less times along one or both of the horizontal and vertical axes. For example, the bag could be folded into halves, into fourths, into fifths, or into some other division in the vertical direction, the horizontal direction, or both. Additionally, in alternative embodiments the bag could be folded along the vertical axes before the bag is folded along horizontal axes, or in some embodiments the bag could alternate being folded along the vertical and horizontal axes. It will be recognized that the horizontal divisions do not have to be the same as the vertical divisions, for example the bag could be folded in half vertically and into fourths horizontally. In alternative embodiments, the bag is folded along one or more diagonal creases such as a crease traversing from the top left portion of the bag to the lower right, or a crease traversing from the top right portion of the bag to the lower left. These diagonal creases could be present either instead of, or in addition to, the vertical or horizontal creases. In embodiments wherein the bag is folded along a diagonal crease the covering feature may be rotated such that the sides of the covering feature are not perpendicular to the sides of the bag. Additionally, the flap may be attached to a point on the bag, which is not centrally located such as a point closer to one of the corners of the bag. In this embodiment, the drawstring may also protrude from the bag at a different location further away from the left or right side of the bag.

In other embodiments the bag 10 may include one or more handles for ease of carrying when the bag is unfolded. Additionally, the opening 45 may further include a zipper or a snap to seal and un-seal the opening. In this embodiment, the drawstring 55 may not be operable to open and close the bag, and instead may simply be replaced by a cord, a cable, a cord loop or some other extended flexible member which is affixed to the bag at the left seam 20a or the right seam 25a such that the bag may still be transported by the cord or cable when the bag is in its folded or stored state. In this embodiment the cord, cable, or cord loop are affixed to the left seam 20a or the right seam 25a in close proximity with, and preferably adjacent to, the flap 80. In certain other embodiments the drawstring 55 may be a single cord or a double cord with at least two stoppers.

Figure 5:
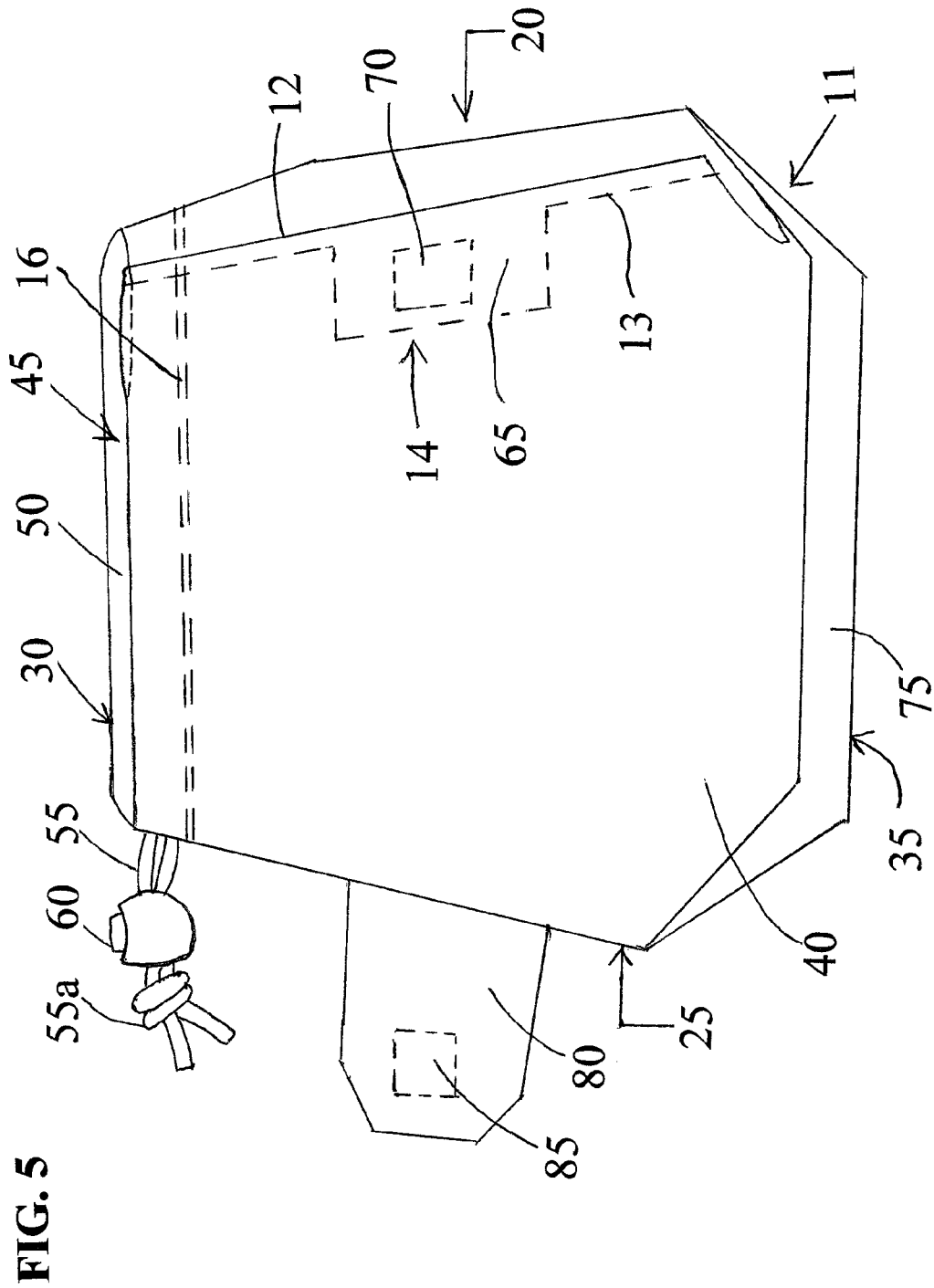
FIG. 5 is a back view of a second preferred embodiment of a bag according to the present invention. The bag is in an unfolded position.

FIG. 5 shows a back view of a second preferred embodiment of a refoldable and reusable bag 11 according to the present invention. The bag 11 of FIG. 5 is very similar to the bag 10 of the first preferred embodiment and, therefore, the same reference numerals represent similar features as described in relation to the bag 10 of FIGS. 1-4, except as otherwise noted herein. One primary difference, the bag 11 includes a pleat or folded attachment member 12 extending the entire vertical length of the back panel 95 of the bag 11. The folded attachment member is formed by folding a portion of the back panel over itself and securing a portion of the fold with at least one stitched segment. This fold or pleat includes a vertical seam having at least one stitched segment 13. Preferably, the stitched segment 13 jogs inward toward the center of the bag on the back panel 95 to form a pocket or overlay 14. This pocket is adapted to receive the flap 80 when the bag 11 is in the folded position. A mating hook and loop fastener 87 is fixed to the back panel so to position under the pocket region. One key advantage to this configuration is that the bag 11 is economical to produce in a mass assembly operation as the mating hook and loop portion 87 can be affixed to the panel 95 before the folded attachment member 12 is formed.

The bag 11 includes an attaching mechanism 115, which can be used in a loop form to attach a carabiner, for example. The drawstring 55, as previously discussed, is retained near the open top portion 30 by another seam 15, for example.

These and other similar alternatives, variations, and equivalents are envisioned and fall within the spirit and scope of the present invention. Similarly, it will be noted that the above-described examples are intended merely for the purpose of illustration and should not be construed to limit the spirit or the scope of the current disclosure in any way.

The bag of the present invention includes panels, including the bottom and sides, any panel or combination of panels may include gussets or may not include gussets, as would be well appreciated by those of skill in the art.

Although the invention has been particularly shown and described with reference to certain embodiments, it will be understood by those skilled in the art that various changes in form and detail may be made without departing from the spirit and scope of the invention.

We claim:

1. A bag adapted for reuse and to be easily refolded, the bag comprising:
   a top portion, a bottom portion, a first side, a second side, a first face, and a second face;
   a flap attached to the first side of the bag and extending outward from the bag with a flap adhesive element affixed to the flap and co-facing with the second face of the bag; and
   a covering feature generally centrally located on the first face of the bag, and arranged to cooperate with the flap, the flap further adapted to insert under a portion of the covering feature, the covering feature being coupled to the first face:
   an interior portion generally located between the first side and the second side and accessible through an opening in the top portion; and
   at least one of the following a drawstring, a locking mechanism affixed to a drawstring, or a stopper affixed to the drawstring being located generally between the interior portion and the front face, and generally between the interior portion and the rear face, and protruding from an opening in the bag.

2. The bag of claim 1 further comprising:
   a protected adhesive element affixed to at least one of the first face of the bag and the covering feature and located directly under the covering feature such that the protected adhesive element is located between the first face of the bag and the covering feature.

3. The bag of claim 1 further comprising:
a loop coupled to the first side of the bad adjacent to the flap.

4. The bag of claim 3 wherein the loop further includes:
a carabineer having a first end coupled to the loop.

5. The bag of claim 1 and further comprising:
an interior portion generally located between the first side and the second side and accessible through an opening in the top portion; and wherein the interior portion has an empty volume of less than a quart.

6. The bag of claim 1 further comprising:
an interior portion generally located between the first side and the second side and accessible through an opening in the top portion; and wherein the interior portion has an empty volume of at least one gallon.

7. The bag of claim 1 wherein the flap adhesive element and the protected adhesive element each comprise at least one of a snap, a loop, and a hook type fastener.

8. The bag of claim 1 wherein the covering feature comprises a first visual element wherein the visual element is visible to an observer whether the bag is in a folded state or an unfolded state.

9. The bag of claim 8 wherein the visual element comprises an identifying label.

10. The bag of claim 1 comprising a drawstring wherein the drawstring protrudes from the first side of the bag.

11. A bag well-suited for reuse and to be folded and refolded, the bag comprising:
a top portion, a bottom portion, a first side, a second side, a first face, and a second face, wherein the second side further comprises
a back panel having a vertically arranged folded attachment member extending substantially from the top portion to the bottom portion, the fold attachment member formed by folding a portion of the back panel over itself and securing a portion of the fold with at least one stitched segment;
a flap coupled to the first side of the bag at an edge and extending outward from the bag with a flap adhesive element affixed to the flap and co-facing with the second face of the bag; and
a protected adhesive element affixed to at least the back panel and adapted to selectively couple and decouple to the flap adhesive element; and
a pocket portion forming a covering feature wherein the protected adhesive element arranges between the first face of the bag and the folded attachment member.

12. The bag of claim 11 further comprising:
At least one strap arranged vertically along the first face, the strap having at least one stitched segment running along its vertical axis, the stitched segment further comprising a gap sufficient to insert a portion of the flap thereunder.

* * * * *